United States Patent [19]

Abraham et al.

[11] Patent Number: 5,510,209

[45] Date of Patent: Apr. 23, 1996

[54] SOLID POLYMER ELECTROLYTE-BASED OXYGEN BATTERIES

[75] Inventors: Kuzhikalail M. Abraham, Needham; Zhiping Jiang, Sharon, both of Mass.

[73] Assignee: EIC Laboratories, Inc., Norwood, Mass.

[21] Appl. No.: 369,032

[22] Filed: Jan. 5, 1995

[51] Int. Cl.$^6$ .............. H01M 6/16; H01M 6/18; H01M 8/10

[52] U.S. Cl. .............. 429/192; 429/218; 429/27; 429/29; 429/33

[58] Field of Search .............. 429/218, 229, 429/224, 192, 27, 29, 33

[56] References Cited

U.S. PATENT DOCUMENTS

| | | | |
|---|---|---|---|
| 3,540,935 | 11/1970 | Keating et al. | 429/229 |
| 4,178,418 | 12/1979 | Croset et al. | 429/27 |
| 4,255,498 | 3/1981 | Yoshida | 429/27 |
| 4,617,242 | 10/1986 | Dopp | 429/229 |
| 4,803,134 | 2/1989 | Sammells | 429/27 |
| 4,925,544 | 5/1990 | Goldring | 429/192 |
| 5,252,413 | 10/1993 | Alamgir et al. | 429/192 |
| 5,378,562 | 1/1995 | Passaniti et al. | 429/224 |
| 5,403,675 | 4/1995 | Ogata et al. | 429/33 |

OTHER PUBLICATIONS

Vassort et al., "ACEP Ambient Temperature Lithium Batteries, Improved Performance," published in *Primary and Secondary Ambient Temperature Li Batteries*, The Electrochemical Society, Pennington, N.J., PV88-6, 780 (1986) month unavailable.

Abraham and Alamgir, "Room Temperature Polymer Electrolytes and Batteries Based on Them," Published in Solid State Ionics, 70/71, p. 20 (1994). month unavailable.

*Primary Examiner*—Prince Willis, Jr.
*Assistant Examiner*—Carol Chaney

[57] ABSTRACT

This invention features polymer-based batteries comprising metal anodes and an oxygen gas cathode. The oxygen is not stored in the battery but rather it is accessed from the environment. This solid-state battery is constructed by sandwiching a metal ion conductive polymer electrolyte film between a metal anode (negative electrode) and a composite carbon electrode which serves as the cathode current collector on which the electroactive oxygen is reduced during discharge of the battery to generate electric current. The metal anodes include lithium, magnesium, sodium, calcium, aluminum and zinc.

12 Claims, 4 Drawing Sheets

SOLID POLYMER ELECTROLYTE-BASED OXYGEN BATTERIES

This invention was made with financial support from the National Aeronautics and Space Administration under Contract No. NAS9-18924. The U.S. Government has certain rights in this invention.

FIELD OF INVENTION

This invention features a polymer electrolyte-based Li battery with oxygen gas as the electroactive cathode (positive electrode) material. The oxygen is not stored in the battery but rather it is accessed from the environment. This solid-state battery is constructed by sandwiching a Li-ion conductive solid polymer electrolyte film between a Li anode (negative electrode) and a composite carbon electrode which serves as the cathode current collector on which the electroactive oxygen is reduced during discharge of the battery to generate electric current. The lithium anode in the battery can be replaced with another electroactive metallic anode selected from magnesium, sodium, calcium, aluminum, and zinc.

BACKGROUND OF THE INVENTION

The electroactive cathode in a conventional polymer electrolyte-based battery is composed of a solid-state material such as a transition metal oxide or a transition metal chalcogenide. Examples of such materials are the oxides, $V_2O_5$, $V_6O_{13}$, $LiCoO_2$, $LiMn_2O_2$, and the chalcogenides $TiS_2$, $MoS_2$, $NbSe_3$, and $MoS_3$. A polymer electrolyte-based lithium battery cell utilizing a solid-state cathode material is fabricated by sandwiching a polymer electrolyte film between a Li foil anode (negative electrode) and the said, electroactive, solid-state cathode (positive electrode) that has been fashioned in to a composite electrode. Typically, the latter is fabricated by rolling, pressing or extruding a mixture of the solid-state cathode material, the polymer electrolyte and an electronic conductor (usually a high surface-area carbon) into a thin film on a metal foil, usually Al. The polymer electrolyte film placed between the composite cathode and the Li anode serves both as the separator in the battery and the medium through which Li ions are transported from the Li anode to the cathode during battery discharge. The reaction at the solid-state cathode during battery discharge involves the insertion of Li ions into crystal lattice sites in the cathode material with the positive charge on the Li being compensated for by electrons injected into the conduction bands of the cathode material from the external circuit. During recharge of the battery the opposite process takes place. These cathode reactions are illustrated in equation [1] using $TiS_2$ as the example.

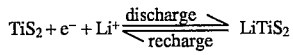

[1]

Reactions involving other Li inserting cathode materials are well-known to those skilled in the art.

Vassort et. al. (in Proceedings of the Symposium on "Primary and Secondary Ambient Temperature Lithium Batteries", J. P. Gabano et. al., eds., The Electrochemical Society, 10 South Main Street, Pennington, N.J. (PV88–6, 780 (1988)), have described polymer electrolyte-based Li/TiS$_2$, and Li/MnO$_2$ cells containing polymer electrolytes composed of Li salt (e.g., LiCClO$_4$ or LiCF$_3$SO$_3$) complexes of poly(ethylene oxide). Abraham and Alamgir have reported (in Solid-State Ionics, 70/71, 20 (1994)) on Li/LiMn$_2$O$_4$ cells containing polymer electrolytes composed of polyacrylonitrile (PAN), propylene carbonate (PC), ethylene carbonate (EC) and a Li salt (e.g., LiClO$_4$, LiAsF$_6$, LiN(SO$_2$CF$_3$)$_2$ or LiPF$_6$). ). Alamgir and Abraham have also disclosed in U.S. Pat. No. 5,252,413, solid polymer electrolyte-based Li batteries in which the cathode active material is $TiS_2$, $V_6O_3$, $FeS_2$, $LiNiO_2$, $LiCoO_2$ or $LiMn_2O_4$ and the polymer electrolyte is composed of poly(vinyl chloride), an aprotic organic solvent (or a mixture of such solvents) and a Li salt (e.g., LiClO$_4$, LiBF$_4$, LiAsF$_6$, LiCF$_3$SO$_3$; LiPF$_6$, or LiN(SO$_2$CF$_3$)$_2$).

In this patent application, we disclose a polymer electrolyte-based Li battery which is unlike any of the polymer electrolyte-based batteries known to-date. This battery has oxygen (O$_2$) gas as its electroactive cathode, and the battery discharge reaction involves the reduction of oxygen to form lithium oxide.

SUMMARY OF THE INVENTION

An object of this invention is to provide a novel solid polymer electrolyte-based Li battery.

A further object of this invention is to provide a solid polymer electrolyte-based lithium battery comprising an electroactive metal anode, for example Li, an electroactive cathode composed of oxygen gas and a polymer electrolyte film which serves both as the separator in the battery and the medium through which Li$^+$ ions are transported from the anode to the cathode during battery discharge. The oxygen is not stored in the battery but, rather, it is accessed from the environment and reduced on a positive electrode current collector composed of high surface area carbon such as carbon black and graphite powder.

This battery with Li as the anode has an open circuit voltage of about 2.9V, load voltages between 2 and 2.9V depending upon the load current, and a theoretical specific energy of 5200 Wh/kg. The Li metal anode in the battery can be replaced with Ca, Mg, Na, aluminum or zinc.

DETAILED DESCRIPTION OF THE INVENTION

Figure 1:
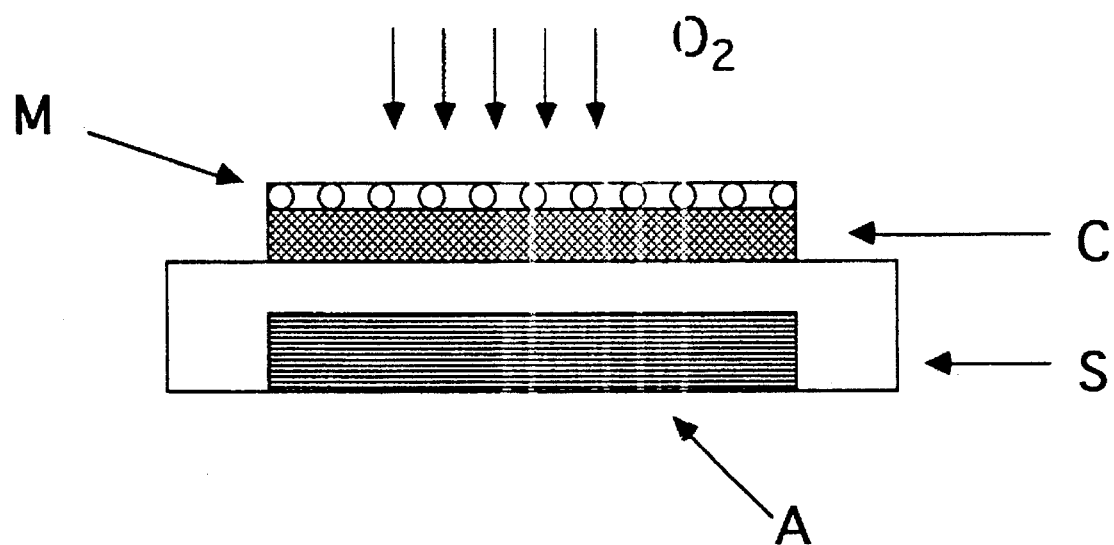
FIG. 1 depicts a schematic representation of a polymer electrolyte-based Li/O$_2$ battery cell.

The invention is understood by referring to FIG. 1 which depicts a polymer electrolyte-based Li/O$_2$ battery cell. In this FIG. 1 is the solid polymer electrolyte, A is the Li anode (negative electrode), C is the composite positive electrode current collector prepared from graphite powder or carbon black, O$_2$ is oxygen, the electroactive cathode material, which is accessed from the environment, and M is an oxygen permeable membrane through which $O_2$ is transported to the porous carbon electrode. Among the solid polymer electrolytes suitable for use in the $Li/O_2$ battery are those described by Abraham and Alamgir in Solid State Ionics, 70/71, 20 (1994). An example is the poly(acrylonitrile)-based electrolytes composed of PAN, EC, PC and $LiPF_6$. Lithium salts other than $LiPF_6$ can be used and they include $LiAsF_6$, $LiClO_4$, $LiN(SO_2CF_3)_2$, $LiBF_4$, and $LiCF_3SO_3$. The requirement for a Li salt useful in this battery is that it is sufficiently soluble in the electrolyte to form a conductive solution. Other examples of polymer electrolytes are those based on poly(vinyl chloride), poly(vinyl sulfone) poly(vinyl pyrrolidinone), poly(ethylene glycol diacrylate), poly(vinylidine fluoride, poly(tetrahydrofuran), poly(dioxolane) and poly(ethylene oxide), their derivatives and mixtures thereof.

Li salts and solvents suitable for preparing the electrolytes of this invention are preferably selected on the basis of the same principles used for selecting these components for highly conductive liquid electrolytes. These requirements include: 1) Li salts having large anions and low lattice energies such as $LiClO_4$, $LiAsF_6$, $LiBF_4$, $FiCF_3SO_3$, $LiPF_6$ and $LiN(CF_3SO_2)_2$; 2) organic solvents with high dielectric constants to promote the dissociation of the low lattice energy Li salts, thereby forming highly conductive electrolyte medium; 3) organic solvents having electron donor atoms such as O and N through which the solvents can form complexes (or solvates) with the Li ions of the Li salt. These requirements are realized with Li salts such as $LiClO_4$, $LiPF_6$, $LiN(SO_2CF_3)_2$ and $LiAsF_6$, and organic solvents such as PC and EC with dielectric constants of 64.4 and 89.6, respectively.

In addition to ethylene carbonate and propylene carbonate, organic solvents preferred for preparing solid polymer electrolytes of the present invention are dimethyl sulfoxide (DMSO), tetramethylene sulfone (sulfolane), γ-butyrolactone, N-methyl pyrrolidinone (NMP) and tri—and tetraglymes. These solvents have high boiling points, which augment the preparation of electrolyte films with good dimensional stability. Dimensional stability is defined as the ability of the electrolyte to be isolated as free-standing films.

For high energy density ambient temperature battery embodying this invention, the negative electrode material preferably consists of lithium. For certain other battery applications it may consist of lithium alloy or amalgam. If a lithium alloy is used, it preferably is a lithium-tin, lithium-lead, lithium-zinc, lithium-aluminum or lithium-magnesium alloy having at least 50%, more preferably at least 65% lithium by weight. The porous electrode on which 02 is reduced during discharge of the battery is fabricated as a composite electrode from a mixture consisting of a high surface area carbon powder and the polymer electrolyte. Candidates for the high surface area carbon include graphite powder or a poorly crystalline carbon such as acetylene black. The purpose of the carbon is to provide an electrode surface to reduce $O_2$ during discharge of the battery. Consequently, any carbon with a sufficiently high surface area can be used. In general, carbons having higher surface areas are preferred since the rate of discharge of the battery increases with increasing surface area of the carbon used for fabricating the positive electrode. A high surface area carbon also allows the preparation of a positive electrode current collector with sufficiently high porosity to allow permeation of high concentrations of $O_2$ into the interior of the carbon electrode for efficient reduction. The $Li/O_2$ battery of this invention has an open-circuit voltage of about 2.80V which is consistent with the cell reaction, $$2Li + \tfrac{1}{2}O_2 \rightarrow Li_2O; E°=2.91V \qquad [2]$$

Figure 2:
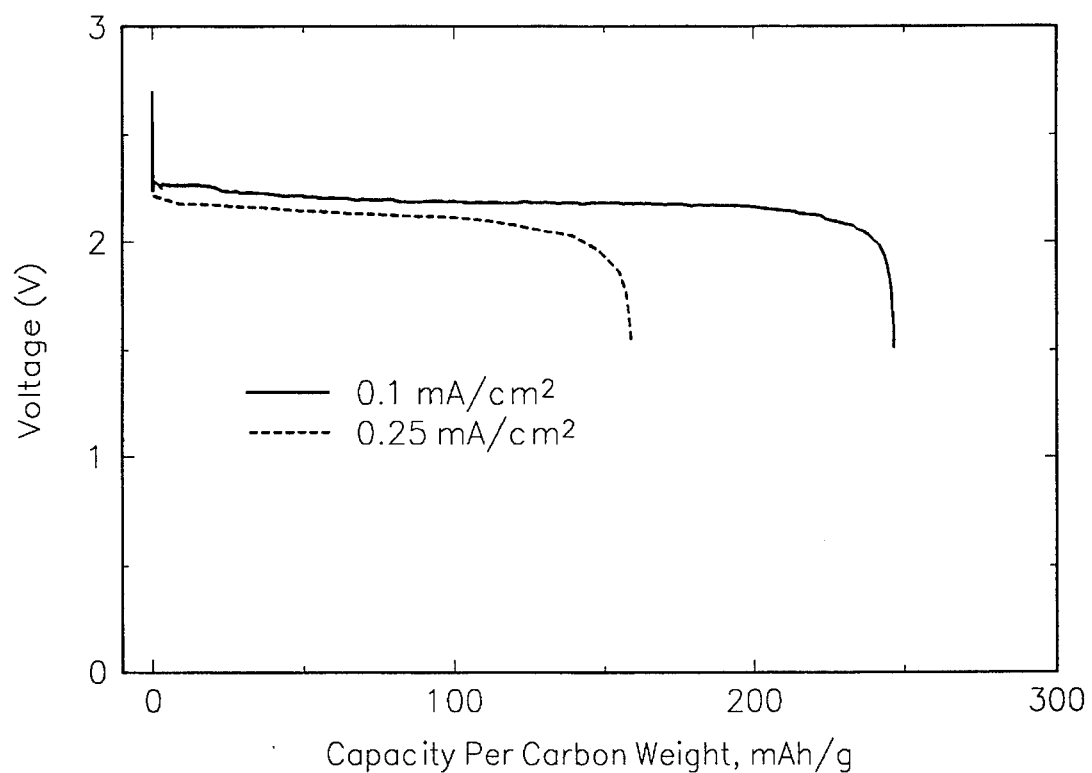
FIG. 2 depicts the discharge curves for Li/O$_2$ cells at the current densities of 0.1 and 0.25 mA/cm$^2$, with composite positive electrode current collector containing graphite powder. The polymer electrolyte composition in these cells is 8 (weight-percent, w/o) PA, 80 w/o EC/PC-12 w/o LiPF$_6$.
Figure 3:
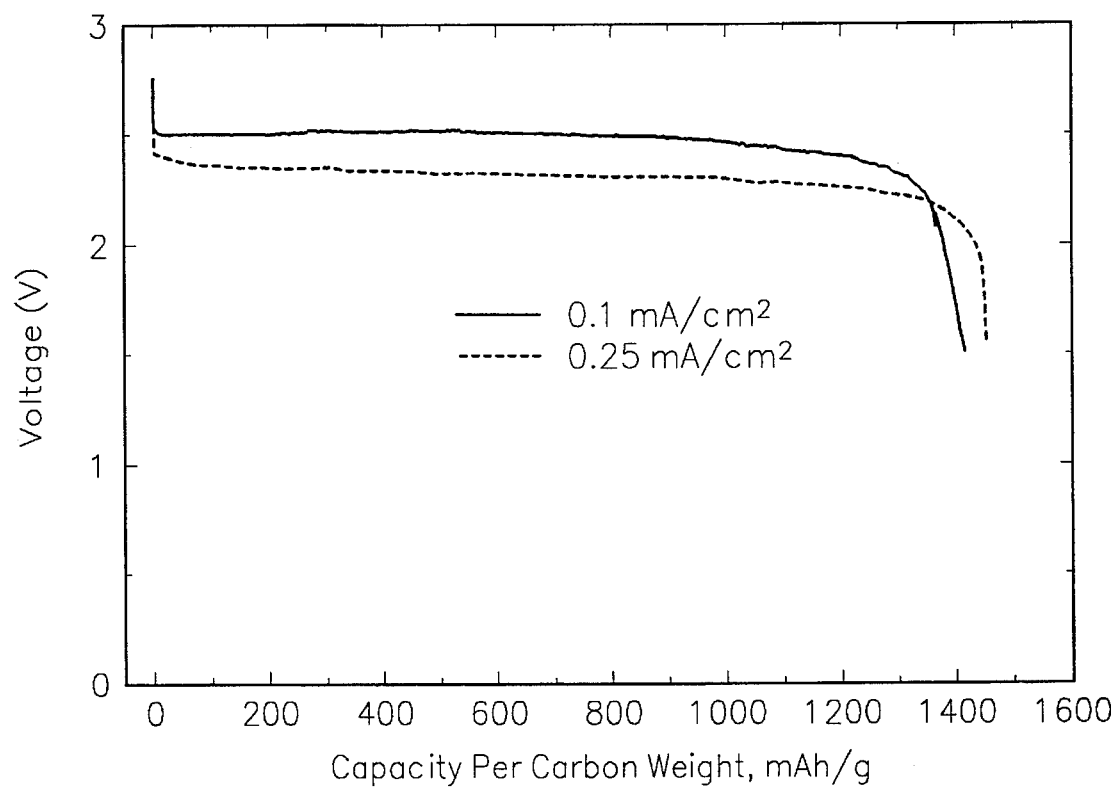
FIG. 3 depicts the discharge curves for Li/O$_2$ cells at 0.1 and 0.25 mA/cm$^2$, with composite positive electrode current collector containing acetylene black carbon. The polymer electrolyte composition is 12 w/o PAN-80 w/o EC/PC-8 w/o LiAsF$_6$.

Depending upon the current density, the load voltage of the cell during discharge varies between this open-circuit voltage and about 2.0V. FIG. 2 depicts the discharge curves for Li/O2 polymer batteries with a graphite composite positive electrode current collector and a PAN-based polymer electrolyte. FIG. 3 depicts the discharge curves for $Li/O_2$ polymer batteries with an acetylene black carbon composite electrode current collector and a PAN-based electrolyte. The cell capacity is expressed as the electrochemical charge obtained, in milliampere-hour (mAh) per gram of carbon in the composite positive electrode.

Further, the oxygen cathode of this invention is suitable for use in conjunction with Li insertion anodes such as lithiated graphitic carbon ($Li_xC_6$), $Li_xTiS_2$ or $Li_xWO_2$. The graphitic carbon will be that derived from graphite, petroleum coke, benzene or other carbonaceous materials.

The polymer electrolyte-based oxygen battery of this invention can be made with an anode other than one containing Li. For example, Na, Ca, Mg or Zn may be substituted for Li to give polymer electrolyte-based $Na/O_2$, $Ca/O_2$, $Mg/O_2$ and $Zn/O_2$ batteries, respectively. Polymer electrolyte in such a battery is conductive to the ion of the metal with which the anode is made up of. The electrochemical reactions in these cells and their calculated cell voltages are given in equations [3–5].

$$2Na + \tfrac{1}{2}O_2 \rightarrow Na_2O, E°=1.94V \qquad [3]$$

$$Ca + \tfrac{1}{2}O_2 \rightarrow CaO, E°=3.12V \qquad [4]$$

$$Mg + \tfrac{1}{2}O_2 \rightarrow MgO, E°=2.93V \qquad [5]$$

$$Zn + \tfrac{1}{2}O_2 \rightarrow ZnO, E°=1.65V \qquad [6]$$

$$1Al + \tfrac{3}{2}O_2 \rightarrow Al_2O_3, E°=2.73V \qquad [7]$$

The following examples further illustrate the present invention.

EXAMPLE 1

A Li/PAN-based polymer electrolyte/oxygen cell (No. 1) was prepared by sandwiching a polymer electrolyte film (having a thickness of 4 mil) between a Li foil (having a thickness of 2 mil) and a graphite composite electrode (having a thickness of 6.7 mil).

The preparation of the polymer electrolyte film was carried out by heating a 12:40:40:8 ratio by weight mixture of PAN, EC, PC and $LiPF_6$ at 135° C. until a homogeneous solution was formed. The solution was then poured between two stainless-steel shims coated with Teflon films, and passed between two rollers. On cooling, dimensionally stable polymer electrolyte films were formed.

The graphite composite electrode current collector was prepared from a 40:60 by weight-percent mixture of a natural graphite powder with 10 μm average particle size (Alfa) and the polymer electrolyte by depositing it on a Ni screen.

The Li/polymer electrolyte/graphite cell package was enclosed in a D-cell can and an atmosphere of oxygen gas was maintained inside the can. The cell showed an open circuit voltage (OCV) of 2.69V. It was discharged at room temperature at 0.1 mA/cm² to a 1.5V cutoff. Another Li/oxygen cell (No. 2) with electrolyte and graphite electrode similar to those used in cell No. 1 was fabricated and discharged at room temperature at 0.25 mA/cm². The results for cells No. 1 and 2 were graphically presented in FIG. 2 and are tabulated in Table 1.

TABLE 1

Discharge Data for Cells Nos. 1 and 2.

| Cell No. | Cathode Thickness (mil) | Current Density (mA/cm$^2$) | OCV[a] (V) | Discharge Voltage (V) | Cell Capacity[b] (mAh/g) |
|---|---|---|---|---|---|
| 1 | 6.7 | 0.1 | 2.69 | 2.19 | 246.5 |
| 2 | 4.0 | 0.1 | 2.76 | 2.14 | 159.2 |

[a]OCV is open circuit voltage.
[b]Cell capacity is expressed as milliampere-hour per gram of carbon.

EXAMPLE 2

A Li/PAN-based polymer electrolyte/oxygen cell (No. 3) was prepared by sandwiching polymer electrolyte (having a thickness of 4 mil) between a Li foil (having a thickness of 2 mil) and an acetylene black-based carbon composite electrode current collector (having a thickness of 5.5 mil). The electrolyte was prepared in the same way as in Example 1. The carbon composite electrode was prepared from a 20:80 by weight-percent mixture of acetylene black carbon (surface area ~40 m2/g) and the polymer electrolyte by depositing it on a Ni screen. The Li/polymer electrolyte/ carbon cell package was enclosed in a D-cell can and an atmosphere of oxygen was maintained in it. The cell had an OCV of 2.79V. The cell was discharged at room temperature at 0.1 mA/cm$^2$ to a 1.5V cutoff. Additional Li/oxygen cells (No. 4 to No. 7) with electrolytes and carbon electrodes similar to those used in cell No. 3 were fabricated and discharged at various current densities. The results for cells No. 3 and 4 are graphically presented in FIG. 3 and are tabulated in Table 2, along with data for additional cells, 5–7, fabricated in the same manner.

TABLE 2

Specifications for Cells No. 3–7 and Their Discharge Data.

| Cell No. | Cathode Thickness (mil) | Current Density (mA/cm$^2$) | OCV (V) | Discharge Voltage (V) | Cell Capacity (mAh/g) |
|---|---|---|---|---|---|
| 3 | 5.5 | 0.1 | 2.79 | 2.5 | 1415.8 |
| 4 | 3.2 | 0.25 | 2.75 | 2.33 | 1453.3 |
| 5 | 4.3 | 0.5 | 2.80 | 2.25 | 790.9 |
| 6 | 3.4 | 1.0 | 2.77 | 2.22 | 776.3 |
| 7 | 6.3 | 2.0 | 2.80 | 2.20 | 613.5 |

EXAMPLE 3

A Li/PAN-based polymer electrolyte/oxygen cell (No. 8) was prepared by sandwiching a polymer electrolyte film (having a thickness of 4 mil) between a Li foil (having a thickness of 2 mil) and an acetylene black carbon composite electrode current collector (having a thickness of 6.6 mil). The electrolyte and the carbon electrode were prepared in the same way as in Example 2 except that LiPF$_6$ was replaced with LiAsF$_6$ in both the electrolyte and the carbon electrode. The Li/polymer electrolyte carbon/cell package was enclosed in a D-cell can and an atmosphere oxygen was maintained in it. The cell had an OCV of 2.85V. Then the cell was discharged at room temperature at 0.1 mA/cm$^2$ to the voltage cutoff of 1.5V. A Li/oxygen cell (No. 9) with electrolyte and electrode similar to those used in cell No. 8 was fabricated and discharged at room temperature at 0.25 mA/cm$^2$. The results for both cells No. 8 and No. 9 are shown in Table 3.

Table 3

Specifications for Cells No. 8 and 9 and Their Discharge Data.

| Cell No. | Cathode Thickness (mil) | Current Density (mA/cm$^2$) | OCV (V) | Discharge Voltage (V) | Cell Capacity (mAh/g) |
|---|---|---|---|---|---|
| 8 | 6.6 | 0.1 | 2.86 | 2.60 | 1122.8 |
| 9 | 6.8 | 0.25 | 2.83 | 2.51 | 976.5 |

EXAMPLE 4

A Li/PAN-based polymer electrolyte/oxygen cell (No. 10) was prepared by sandwiching polymer electrolyte film (having a thickness of 4 rail) between a Li foil (having a thickness of 2 rail) and an acetylene black carbon composite electrode current collector (having a thickness of 6.5 mil). The electrolyte and the carbon electrode were prepared in the same way as in Example 2 except that LiPF$_6$ was replaced with LiClO$_4$ in both the electrolyte and the carbon electrode. The Li/polymer electrolyte/carbon cell package was enclosed in a D-cell can and an atmosphere oxygen was maintained in it. Then the cell was discharged at room temperature at 0.1 mA/cm$^2$ to a 1.5V cutoff. Another Li/oxygen cell (No. 11 ) with electrolyte and carbon electrode similar to those used in cell No. 10 was fabricated and discharged at room temperature at 0.25 mA/cm$^2$. The results for both cells No. 10 and No. 11 are presented in Table 4.

TABLE 4

Specifications for Cells No. 10 and 11 and Their Discharge Data.

| Cell No. | Cathode Thickness (mil) | Current Density (mA/cm$^2$) | OCV (V) | Discharge Voltage (V) | Cell Capacity (mAh/g) |
|---|---|---|---|---|---|
| 10 | 6.5 | 0.1 | 2.85 | 2.56 | 1031.9 |
| 11 | 5.6 | 0.25 | 2.87 | 2.40 | 662.8 |

EXAMPLE 5

A Li/PAN-based polymer electrolyte/oxygen cell (No. 12) was prepared by sandwiching polymer electrolyte film (having a thickness of 4 mil) between a Li foil (having a thickness of 2 mil) and an acetylene black carbon composite electrode current collector (having a thickness of 6.1 mil).

The preparation of the polymer electrolyte film was carried out by heating a 9:74:17 ratio by weight of PAN, EC and LiPF$_6$ at 135° C. until a homogeneous solution was formed. The solution was then poured between two stainless-steel shims coated with Teflon films, and passed between two rollers. On cooling, dimensionally stable films were formed.

The acetylene black carbon composite electrode was prepared from a 20:5.1:53.8:10.9:10.2 ratio by weight carbon, PAN, EC, DPC (dipropyl carbonate) and LiPF$_6$ by depositing it on a Ni screen.

The Li/polymer electrolyte/carbon cell current collector was enclosed in a D-cell can and an atmosphere of oxygen was maintained over it. Then the cell was discharged at room temperature at 0.1 mA/cm$^2$ to a 1.5V cutoff. Another Li/oxygen cell (No. 13) with electrolyte and carbon electrode similar to those used in cell No. 12 was fabricated and discharged at room temperature at 0.25 mA/cm$^2$. The results for both cells No. 12 and No. 13 are presented in Table 5.

TABLE 5

Specifications for Cells No. 12 and 13 and Their Discharge Data.

| Cell No. | Cathode Thickness (mil) | Current Density (mA/cm$^2$) | OCV (V) | Discharge Voltage (V) | Cell Capacity (mAh/g) |
|---|---|---|---|---|---|
| 12 | 6.1 | 0.1 | 2.86 | 2.55 | 825.9 |
| 13 | 6.9 | 0.25 | 2.85 | 2.52 | 742.1 |

EXAMPLE 6

A Li/PAN-based polymer electrolyte/oxygen cell (No. 14) was prepared by sandwiching polymer electrolyte film (having a thickness of 4 mil) between a Li foil and a carbon electrode current collector were prepared in the same way as in Example 2. The Li/polymer electrolyte/carbon cell package was enclosed in a D-cell and exposed to a continuously flowing oxygen atmosphere. Then, the cell was discharged at room temperature at 0.1 mA/cm$^2$ to a 1.5V cutoff. The results are presented in Table 6. The data show that the cells have good stability against self-discharge.

TABLE 6

Specifications for Cell No. 14 and Its Discharge Data.

| Cell No. | Cathode Thickness (mil) | Current Density (mA/cm$^2$) | OCV (V) | Discharge Voltage (V) | Cell Capacity (mAh/g) |
|---|---|---|---|---|---|
| 14 | 3.0 | 0.1 | 2.83 | 2.45 | 1022.9 |

EXAMPLE 7

Figure 4:
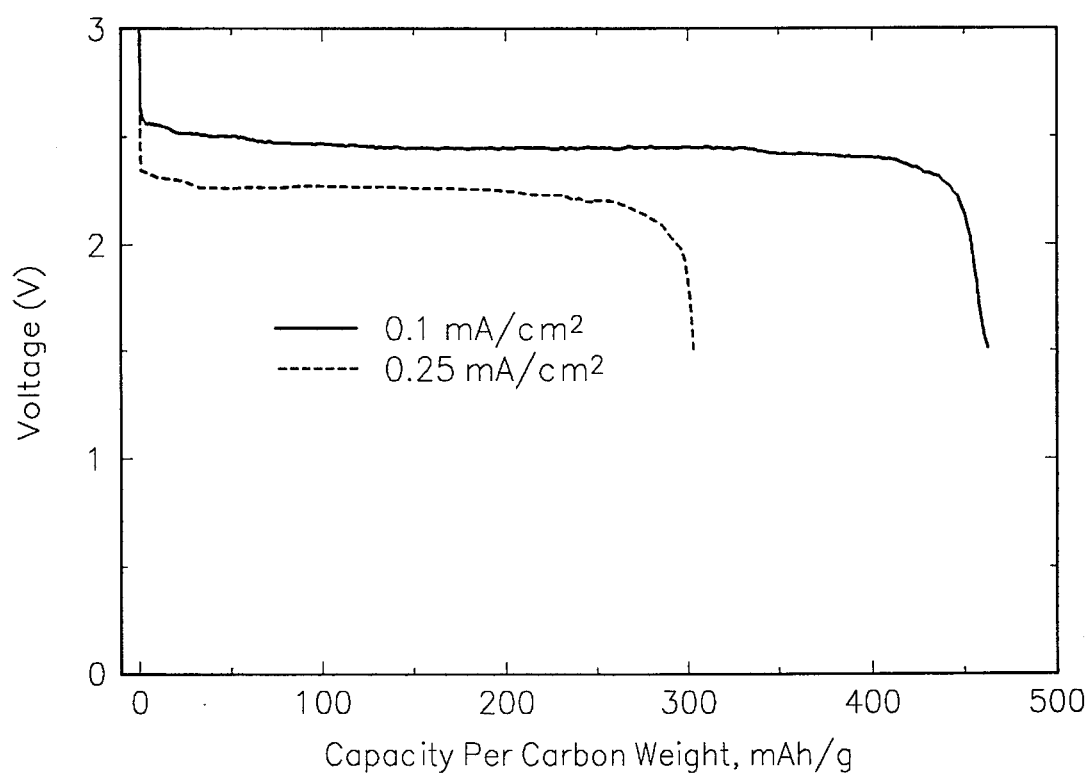
FIG. 4 depicts the discharge curves for Li/oxygen cells at 0.1 and 0.25 mA/cm$^2$ with air accessed from the environment as the cathode active material.

A Li/PAN-based polymer electrolyte/oxygen cell (No. 15) was prepared by sandwiching a polymer electrolyte film (having a thickness of 4 mil) between a Li foil (having a thickness of 2 mil) and an acetylene black carbon composite electrode (having a thickness of 8.1 mil. The electrolyte and the carbon electrode were prepared in the same way as in Example 2. The Li/polymer electrolyte/carbon cell package was enclosed in a D-cell can and the carbon electrode current collector was exposed to the air in the laboratory atmosphere. Then, the cell was discharged at room temperature at 0.1 mA/cm$^2$ to a voltage cutoff of 1.5V. A Li/oxygen cell (No. 16) with electrolyte carbon electrode similar to those used in cell No. 15 was fabricated and discharged in room air at room temperature at 0.25 mA/cm$^2$. The results for Cells No. 14 and No. 15 are graphically presented in FIG. 4 and are given in Table 7.

TABLE 7

Specifications for Cells No. 15 and 16 and Its Discharge Data.

| Cell No. | Cathode Thickness (mil) | Current Density (mA/cm$^2$) | OCV (V) | Discharge Voltage (mAh/g) | Cell Capacity |
|---|---|---|---|---|---|
| 15 | 8.1 | 0.1 | 3.05 | 2.45 | 462.8 |
| 16 | 8.3 | 0.25 | 3.19 | 2.28 | 302.9 |

What is claimed is:

1. An electrochemical cell comprising:
   a metal-containing electroactive anode;
   an oxygen electroactive cathode; and
   a polymer electrolyte disposed between said metal containing anode and said oxygen electroactive cathode; wherein said polymer electrolyte comprises;
   a polymer hose;
   electrolyte salt; and
   a plasticizer solvent chosen from the group of solvents consisting of propylene carbonate, ethylene carbonate, dimethyl sulfoxide, gamma-butyrlactone, tetramethylene sulfone (sulfolane), N-methyl pyrrolidinone, triethylene gylcol dimethyl ether, and tetra-ethylene glycol dimethyl ether, and minutes thereof.

2. The cell of claim 1 wherein said polymer host is chosen from the group of polymers consisting of polyacryonitrile, poly(vinyl chloride), poly(vinyl sulfone), poly(ethylene glycol diacrylate), poly(vinyidene fluoride), poly(tetrahydrofuran), poly(dioxolane), poly(ethylane oxide), poly(propylene oxide), poly(vinyl pyrrolidinoe) and mixtures thereof.

3. The cell of claim 2 wherein said electrolyte salt is chosen from the group of Li salts consisting of LiClO$_4$, LiBF$_4$, LiAsF$_6$, LiCF$_3$SO$_3$, LiPF$_6$, and LiN(SO$_2$CF$_3$)$_2$.

4. The cell of claim 5 wherein said metal-containing electroactive anode is Li.

5. The cell of claim 3 wherein said metal-containing electroactive anode is a lithium alloy selected from the group of lithium alloys consisting of lithium-aluminum, lithium-tin, lithium-magnesium, lithium-lead, lithium-zinc and lithium-boron.

6. The cell of claim 1 wherein said metal-containing electroactive anode is an alkali metal selected from the group of alkali metals consisting of Na, K, Rb, and Cs.

7. The cell of claim 1 wherein said metal-containing electroactive anode is an alkaline earth metals from the group of alkaline earth metal consisting of Be, Mg, Ca, Sr, Ba or an alloy thereof.

8. The cell of claim 1 wherein said metal-containing electroactive anode is Zn.

9. The cell of claim 1 wherein said metal-containing electroactive anode is an alloy of Zn.

10. The cell of claim 1 wherein said metal-containing electroactive anode is Al.

11. The cell of claim 1 wherein said metal-containing electroacitve anode is an alloy of Al.

12. The cell of claim 1 wherein said electrolyte salt is chosen from the group of salts consisting of Mg(ClO$_4$)$_2$, Zn(ClO$_4$)$_2$, LiAlCL$_4$, and Ca(ClO$_4$)$_2$.

* * * * *